United States Patent
Bathen et al.

(10) Patent No.: US 10,601,665 B2
(45) Date of Patent: Mar. 24, 2020

(54) USING BLOCKCHAIN SMART CONTRACTS TO MANAGE DYNAMIC DATA USAGE REQUIREMENTS

(71) Applicant: International Business Machines Corporation, Armonk, NY (US)

(72) Inventors: Luis Angel D. Bathen, Placentia, CA (US); Gabor Madl, San Jose, CA (US); Ramani Routray, San Jose, CA (US); Sangeetha Seshadri, Santa Clara, CA (US)

(73) Assignee: International Business Machines Corporation, Armonk, NY (US)

(*) Notice: Subject to any disclaimer, the term of this patent is extended or adjusted under 35 U.S.C. 154(b) by 74 days.

(21) Appl. No.: 15/659,671

(22) Filed: Jul. 26, 2017

(65) Prior Publication Data
US 2019/0036778 A1    Jan. 31, 2019

(51) Int. Cl.
| | |
|---|---|
| *H04L 12/00* | (2006.01) |
| *H04L 12/24* | (2006.01) |
| *H04L 29/08* | (2006.01) |
| *G06F 16/27* | (2019.01) |
| *G06Q 20/00* | (2012.01) |
| *H04L 12/26* | (2006.01) |

(52) U.S. Cl.
CPC ......... *H04L 41/0893* (2013.01); *G06F 16/27* (2019.01); *G06Q 20/00* (2013.01); *H04L 41/5006* (2013.01); *H04L 43/0876* (2013.01); *H04L 67/1076* (2013.01); *H04L 43/16* (2013.01); *H04L 2209/38* (2013.01)

(58) Field of Classification Search
CPC . H04L 41/0893; H04L 67/1076; H04L 43/16; G06F 16/27
USPC .......................................... 709/223, 225, 229
See application file for complete search history.

(56) References Cited

U.S. PATENT DOCUMENTS

| | | |
|---|---|---|
| 8,055,622 B1 | 11/2011 | Botes et al. |
| 8,914,469 B2 | 12/2014 | Dawson et al. |
| 8,935,366 B2 | 1/2015 | Mehr et al. |
| 9,354,989 B1 | 5/2016 | Sehgal et al. |
| 9,418,015 B2 | 8/2016 | Sundaram et al. |
| 9,424,437 B1 | 8/2016 | Ancin et al. |
| 9,489,137 B2 | 11/2016 | Lewis et al. |
| 9,635,000 B1 * | 4/2017 | Muftic ............... H04L 63/0435 |

(Continued)

FOREIGN PATENT DOCUMENTS

| | | |
|---|---|---|
| WO | 2013134345 A1 | 9/2013 |
| WO | 2017021155 A1 | 2/2017 |

OTHER PUBLICATIONS

Ferdous et al.; Decentralized Runtime Monitoring for Access Control Systems in Cloud Federations, (see as copied attached).

(Continued)

*Primary Examiner* — Frantz Coby

(57) ABSTRACT

An example operation may include one or more of identifying one or more data volume management policies from a plurality of different parties, storing the one or more data volume management policies in a smart contract stored on a blockchain, identifying one or more data access thresholds being exceeded on a network, modifying an operating status of the network based on the one or more policies and the one or more data access thresholds being exceeded, and storing the modified operating status in the blockchain.

20 Claims, 7 Drawing Sheets

(56) References Cited

U.S. PATENT DOCUMENTS

| | | | |
|---|---|---|---|
| 9,722,790 B2* | 8/2017 | Ebrahimi | H04L 9/3066 |
| 2011/0087593 A1* | 4/2011 | Rigby | G06O 20/04 |
| | | | 705/44 |
| 2011/0184847 A1 | 7/2011 | Axilrod et al. | |
| 2012/0260037 A1 | 10/2012 | Jibbe et al. | |
| 2015/0379510 A1* | 12/2015 | Smith | G06Q 20/3829 |
| | | | 705/71 |
| 2016/0246517 A1 | 8/2016 | Venkatesan et al. | |
| 2017/0046091 A1 | 2/2017 | Antony et al. | |
| 2017/0046689 A1* | 2/2017 | Lohe | G06F 12/1408 |
| 2017/0085545 A1* | 3/2017 | Lohe | H04L 63/062 |
| 2017/0103468 A1* | 4/2017 | Orsini | G06Q 40/12 |
| 2017/0214522 A1* | 7/2017 | Code | H04L 9/3247 |
| 2017/0243025 A1* | 8/2017 | Kurian | G06F 21/6245 |
| 2017/0279774 A1* | 9/2017 | Booz | G06F 16/24568 |
| 2017/0301033 A1* | 10/2017 | Brown | G06Q 50/18 |
| 2018/0001184 A1* | 1/2018 | Tran | H04N 5/2257 |
| 2018/0089641 A1* | 3/2018 | Chan | G06Q 20/0655 |
| 2018/0182052 A1* | 6/2018 | Panagos | G06Q 50/265 |
| 2018/0218176 A1* | 8/2018 | Voorhees | H04L 9/3239 |
| 2018/0218455 A1* | 8/2018 | Kolb | G06Q 20/102 |
| 2018/0225640 A1* | 8/2018 | Chapman | G06Q 20/0855 |
| 2018/0225660 A1* | 8/2018 | Chapman | G06Q 20/065 |
| 2018/0285810 A1 | 10/2018 | Ramachandran et al. | |
| 2018/0287797 A1* | 10/2018 | Banerjee | H04L 9/3239 |
| 2019/0014124 A1* | 1/2019 | Reddy | H04L 63/108 |
| 2019/0028264 A1* | 1/2019 | Bisti | G06F 21/645 |
| 2019/0028265 A1* | 1/2019 | Bisti | G06F 21/645 |
| 2019/0034922 A1 | 1/2019 | Castinado et al. | |
| 2019/0035014 A1* | 1/2019 | Bell | G06Q 40/00 |
| 2019/0079998 A1 | 3/2019 | Rush | |

OTHER PUBLICATIONS

Kazuichi OE et al.; A Hybrid Storage System Composed of On-The-Fly Automated Storage Tiering (OTF-AST) and Caching, (see as copied attached).

Cheng et al.; CAST: Tiering Storage for Data Analytics in The Cloud, (see as copied attached).

* cited by examiner

USING BLOCKCHAIN SMART CONTRACTS TO MANAGE DYNAMIC DATA USAGE REQUIREMENTS

TECHNICAL FIELD

This application generally relates to the management of smart contracts, and more particularly, to using blockchain smart contracts to manage dynamic data usage requirements.

BACKGROUND

A blockchain is a type of computing architecture that enables a peer-to-peer distributed (shared and replicated) database or ledger, not controlled by a single organization or entity, but many different ones. Spanning across a network of independent machines, the configuration permits the nodes to reliably track and maintain the state of information in a system. In doing so, a blockchain enables the cost-efficient creation of business networks without requiring a central point of control. This configuration operates in contrast to traditional database-oriented systems, where independent parties maintain their own systems of record and reconcile updates with one another in inefficient and sometimes complex inter-organizational processes, which requires the services of an independent, trusted third-party administrator.

A blockchains use smart contracts to define the transactions conducted among various blockchain participants. Conditions for accessing and exploiting smart contracts are limited in their capacity to reduce the likelihood of unauthorized access to the blockchain assets. In some examples, the smart contracts are enacted to manage various processes for members or other authorized parties to a blockchain.

Storage 'tiering' helps organizations maintain a balance between performance and cost by moving data around different tiers to cope with swings in demand. Tiering ensures that data sits on the most appropriate storage configuration according to the application requirements, whether it be latency or throughput. Most research efforts have focused on traditional storage systems and tiering across different disk types. For instance, hot data residing in tier 2 (high endurance, high capacity, 10K revolution-per-minute RPM hard drives HDs) can be migrated to high performance, high cost solid state drives (SSDs) if deemed necessary. This process is called 'up-tiering', where a change is made from a lower class tier to a higher class tier. Similarly, cold data that is not being utilized may be migrated from a higher tier (T1) to a colder tier (T2) to make space for more up-tiering. There are many types of tiers used with different data access categories. There are usually several rules with respect to how to map data to the right tier. For example, one of the main metrics dynamic tiering systems use is referred to as input/output (IO) density, which is a function of IO/second/GB. Based on IO density, a decision may be made to up-tier or down-tier storage. Tiering can be performed for object storage, file storage, and block storage. For an object/file, access rate may be examined first, and for a block, the main parameter of interest may be IO density. An example of tier/IO density mapping for block storage may be setup as a tier to IO density correlation, for example, tier 0>=1, tier1B is 0.7-1.0, tier1B is 0.5-0.7, tier2 is 0.1-0.5, tier3 is 0.01-0.1, nearline is 0.0-0.01, inactive is 0 and unknown is null.

System administrators/automated systems will use the example metrics of a table to decide where a particular volume should be mapped. Up/down-tiering of a volume involves copying and moving a volume across tiers, these tiers could be within a data center (traditionally), across data centers (same organization/cloud), and across different organizations (e.g., a hybrid-cloud model). Tiering may be optimal for a network, but if not performed correctly (e.g., not using the right policy), there are many things that could go wrong, from a simple mistake, such as putting a volume on the wrong tier, to more serious problems where the volume is lost in-transit with no one to hold accountable. For instance, if a volume is pushed to a tier in a remote organization (e.g., third party cloud), and the volume never makes it to the remote organization, the question is then, what happened?, or who is accountable?

In a traditional tiering solution, storage is allocated and pooled into different tiers, in this example, three tiers, gold, silver, and bronze. When a file system is created/mounted, a request may be made to place the file system on a particular tier based on business needs, performance needs, etc. This process follows simple rules developed by system administrators. Similar to the block storage scenario, what tier to choose is left to the system administrator, or an automated system guided by a set of policies/rules designed by the system administrator. Automated tiering solutions rely on policies and best practices for tiering. These polices are executed by a centralized server/manager and are pre-defined, and are often pre-agreed upon, however, when other parties enter the policy circle, the question then becomes, what policy should be implemented a multi-service provider environment, different best practices may be followed, thus ending in scenarios where the end result deviates from what each party involved in the tiering transaction expected. For instance, consider a scenario where guidelines for tiering are based on best practices defined by network system architects, however, once the tiers are being used, the third parties, which may have their own policies for tiering may be in disagreement regarding the initial policies for tiering.

SUMMARY

One example method of operation may include one or more of identifying one or more data volume management policies from a plurality of different parties, storing the one or more data volume management policies in a smart contract stored on a blockchain, identifying one or more data access thresholds being exceeded on a network, modifying an operating status of the network based on the one or more policies and the one or more data access thresholds being exceeded, and storing the modified operating status in the blockchain.

Another example embodiment may include an apparatus that includes a processor configured to perform one or more of identify one or more data volume management policies from a plurality of different parties, store the one or more data volume management policies in a smart contract stored on a blockchain, identify one or more data access thresholds being exceeded on a network, modify an operating status of the network based on the one or more policies and the one or more data access thresholds being exceeded, and store the modified operating status in the blockchain.

Another example embodiment may include a non-transitory computer readable storage medium configured to store instructions that when executed cause a processor to perform one or more of identifying one or more data volume management policies from a plurality of different parties, storing the one or more data volume management policies in a smart contract stored on a blockchain, identifying one or more data access thresholds being exceeded on a network, modifying an operating status of the network based on the one or more policies and the one or more data access thresholds being exceeded, and storing the modified operating status in the blockchain.

DETAILED DESCRIPTION

Figure 1A:
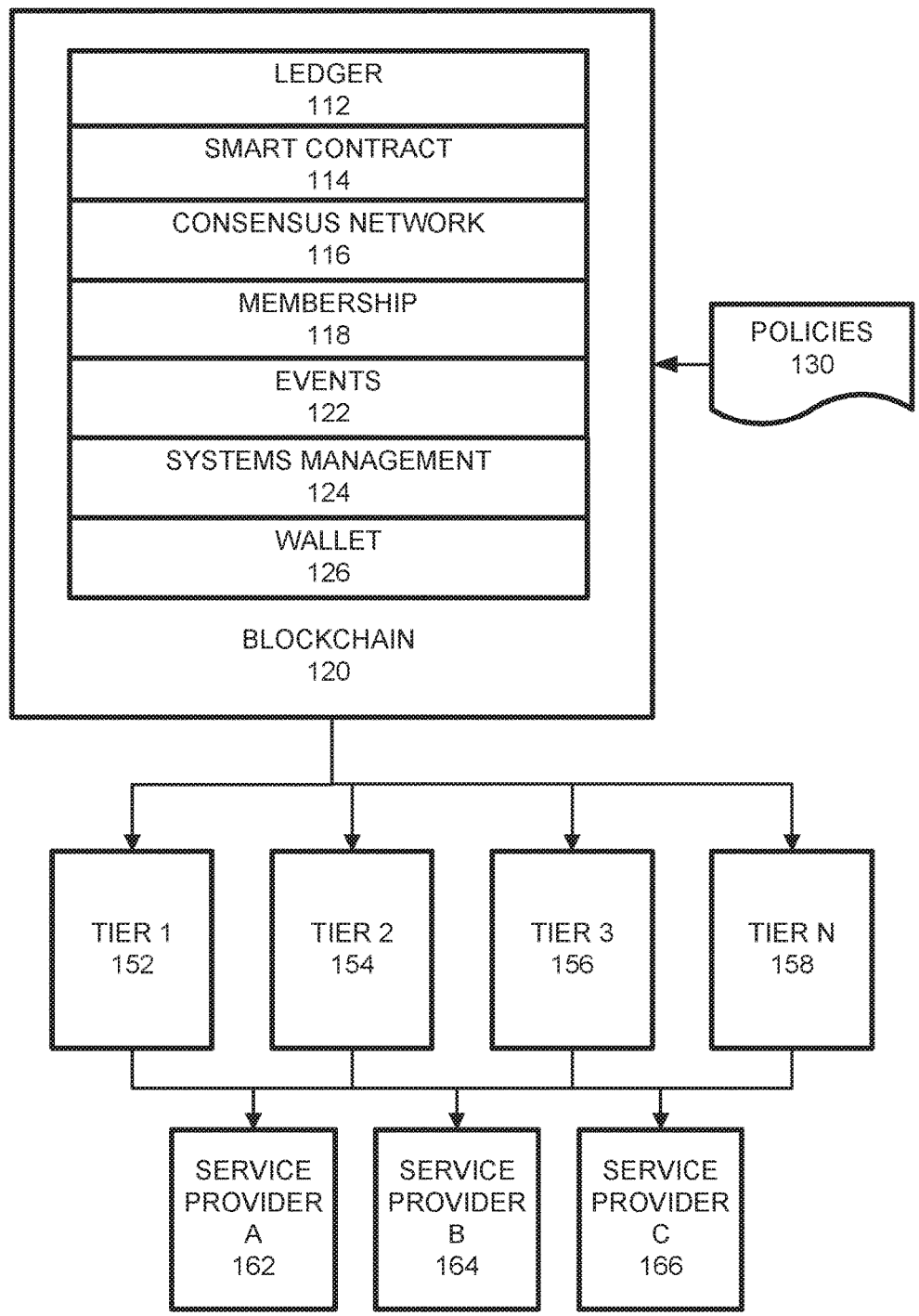
FIG. 1A illustrates a logic diagram of policy data for a smart contract to provide network management via the blockchain, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

The instant application in one embodiment relates to the management of smart contracts, and in another embodiment relates to managing data usage and other network system requirements by updating smart contracts in a shared ledger to reflect necessary changes to the network system.

Example embodiments provide a way to execute policies for network and system management in an automated manner, while at the same time providing a way to have accountability for such management scenarios. Smart contracts may be used to manage and execute a policy (i.e., a smart contract), that has been agreed upon and signed by multiple parties (i.e., the system administrator, management, the third party storage provider, etc.), with the objective of introducing accountability into the tiering process. Consensus may be reached by blockchain members via any of the commonly recognized approaches, such as voting, majority rule, assigned leader rulings, etc. Any actions taken to change, enact or create new policies are recorded in the blockchain, making the blockchain fully immutable, transparent, and auditable. Smart contracts permit all the involved parties in the multi-service environment to agree on what actions to perform and to sign-off on the policies. This permits non-repudiation in the tiering environment, so parties know exactly when and what is going to be executed. All known and registered parties can be held accountable for anything that occurs within the environment.

Example embodiments provide a fully decentralized solution to tiering/ILM for infrastructure as a service (IaaS) in multi-service environments that permit for policy-automation via smart-contracts and information life cycle management (ILM) provenance. All actions taken by the system are recorded in the blockchain, making it fully immutable. In this approach, the smart contract code, or artifacts of code require multiple parties to agree on, and sign off on, in order to implement a particular policy that is executed within an immutable peer-to-peer fabric.

Different organizations, different storage systems, may use different best practices and policies when dealing with tiering and information life cycle management (ILM). The idea provides that instead of relying on independent policies to decide when to up-tier/down-tier data, a process is used where multiple parties may enter into a contract via the development of a mutually agreeable policy that dictates how data is passed through the different tiers. For instance, a simple policy may say, if IO density is greater than 0.5, place the volume in a highest tier class, and if IO density is between 0.1 and 0.5 (exclusive), place the volume into a middle class tier. Also, if the IO density is less than 0.1, place the volume into the lowest tier and do not delete a volume automatically. This policy is then written as simple chaincode, an example of which provides:

```
def execute_policy(volume, policy, party_signatures):
    if volume.io_density >= policy.high_io_density:
        volume.tier = GOLD_TIER
    elif volume.io_density > policy.medium_io_density and
        volume.io_density < policy.high_io_density:
        volume.tier = SILVER_TIER
    else:
        volume.tier = BRONZE_TIER
    # if parties signed the policy
    if valid_signatures (policy, party_signatures):
        execute_tiering_logic(volume, policy).
```

The chaincode may be a policy or set of policies stored in a smart contract and updated when policies emerge. The information in the contract can be readily accessed, executed and compared to the environment intended to be monitored. If deviations occur, changes can be made automatically according to the policies. Notifications may be created and sent to the necessary parties, such as registered administrators or other interested parties.

The use of smart-contracts may provide a way to alleviate policy mismatch, and provenance concerns inherent in storage tiering and ILM solution environments. This approach can be extended to object, file, and block storage types as the procedures are technology agnostic. Similarly, other aspects of ILM such as backup, recovery, and retention policies may also be monitored, identified via policies and modified to accommodate the established requirements of the parties. Once a smart contract is agreed upon by the parties, it is then deployed. As part of the configuration stage, a deploy server will obtain the smart contract from the 'control repository' and forward it onto the blockchain, which could operate within a blockchain peer or by a server outside of the blockchain.

FIG. 1A illustrates a logic diagram 100 of policy data for a smart contract to provide network management via the blockchain, according to example embodiments. Referring to FIG. 1A, the blockchain configuration 120 will be used to provide provenance of tiering/ILM actions by recording events in the form of provenance metadata (e.g., hashes of what data is tiered, how much data, time, etc.), this data is immutable, so there is no way to tamper with those data records. Also, the executing of policies 130 may be performed in the form of chaincode. In one example, the infrastructure-as-a-service environment may include a multi-service provider environment, where storage architects have designed best practices and policies to best serve their client's requirements. Different service providers 162-166 may require different solutions, as a result, there will be a mismatch with respect to how to manage storage resources. For example, with regard to tiering, provider A 162 may select to define fine grained policies for tiering, where each tier (e.g., tier1-152 through tierN-158) have defined IO densities, while provider B 164 may select to define a coarser grained set of policies for tiering, where each tier is mapped to a premium level (e.g., Gold, Silver, Bronze).

In this scenario, a volume with 0.5 IO density may be mapped to tier1, tier2, otherwise known as the gold tier or silver tier. This mapping requires an agreement and a contract to codify what can be executed. In the event of an error with respect to where a volume is mapped, the contract can be audited and there is non-repudiation as the storage architects/administrators involved in the transaction have already signed-off on the contract details and procedures. Once a mapping is agreed upon, the logic may be defined that will simply executed and determine when to modify tiering arrangements even across organizational boundaries, such as one network to another. For instance, when a volume enters provider B's 164 boundaries, the logic may be applied to enact a volume solution. If the volume's IO density is high, the volume will reside within a GOLD_TIER. Provider A 162 would have agreed to set the threshold of >0.5 as a GOLD_TIER, so that in the event that a volume goes through up-tiering/down-tiering, it will be able to be assigned to the correct tier. Similarly, if a volume crosses provider A's boundary, there should be a clear distinction in IO load between GOLD, BRONZE, and SILVER. This is because each provider charges different premiums for the different tiers. For instance, Tier1-Tier2 with provider A 162 may be equivalent to the Gold tier of provider B 164, with respect to IO load, but pricing is different. For instance, provider A's premium fee for tier1 may be higher than tier2, while provider B's premium for the Gold tier is equivalent to tier1/tier2. As a result, in the event that data volumes are going from provider B 164 to provider A 162, provider B 164 might want to state that for the gold tier volumes, they should be mapped to tier1/tier2 in order to respect the service level agreements (SLAs) guarantees offered to the consumer without incurring extra costs due to tiering. The smart contracts can operate beyond thresholds and incorporate items, such as aggressive/conservative policies (e.g., last 45 historical spikes, up/down tiers, etc.) and a window-throttle for tiering, such as a synchronization-rate. A data volume is a portion of a disk and could be physical partitions or logical partitions. However, most configurations perform logical partitions because they are manageable. In operation, a raw disk or set of raw disks can be used to generate a storage pool, and then that pool is used to build logical volumes. The logical volumes can then be assigned to hosts to use as raw data storage.

In general, data volumes are treated as raw storage, so they can be mounted by a file system and used as block storage and/or configured for other uses. Tracking where the volume is may be performed to keep track of the data volume status. This information is obtained by querying the different storage controllers. For instance, the monitor function can have a graph showing where data volumes are mapped, if there is a change in the graph, it must be made according to changes reflected in the blockchain through the chaincode. If something is identified to be different, then a warning/message may trigger and be sent saying there has been a change not reflected in the blockchain.

Once the policy has been identified, it is represented in chaincode. All parties involved in managing the storage backend (e.g., data center administrator, the third party storage provider, etc.) will review and agree on the chaincode to be executed. The chaincode will exist within a common repository where version tracking can be conducted, users can push code/comments, and perform audits, which will provide full transparency in the process. Once the chaincode is agreed upon and all parties (e.g., Party A and Party B, etc.) sign the code, and the code is deployed within the blockchain fabric, then parties cannot deny reviewing it in case something goes wrong. This provides nonrepudiation, so parties are forced to review and sign on any commonly agreed policy. Without the signatures, acknowledgement from parties, the policy will not execute. Moreover, since this goes into an automated system, whenever a volume's IO exceeds a tier's threshold, the data/volume is then submitted to the blockchain fabric, where the chaincode to evaluate the volume information is invoked, and the policy is executed by the fabric. Once tiering is completed, in the event somethings goes wrong, auditors can go back in time and see when tiering was triggered, and what policy was executed (e.g., what chaincode was invoked). This also points to the repository that contains the policy, all of which is immutable so no single party can tamper with the policy or deny on agreeing on a particular policy. The blockchain fabric 120 may include various layers including but not limited to a ledger 112, for storing transactions, a smart contract 114 which may be part of the ledger 112, a consensus network 116 of authorized members who can vote and agree/disagree on policies, membership in general 118 to identify those entities that are part of the blockchain, and events 122 which are triggers for changes or action by the blockchain smart contract terms. Also, the systems management 124 may define the rules and other management policies, and the wallet 126 may be used as an application that accesses the blockchain credits or other exchangeable assets. For example, one example could be a system chaincode, which tracks what changes are made. The changes can be stored in the world state depending on the blockchain platform.

Figure 1B:
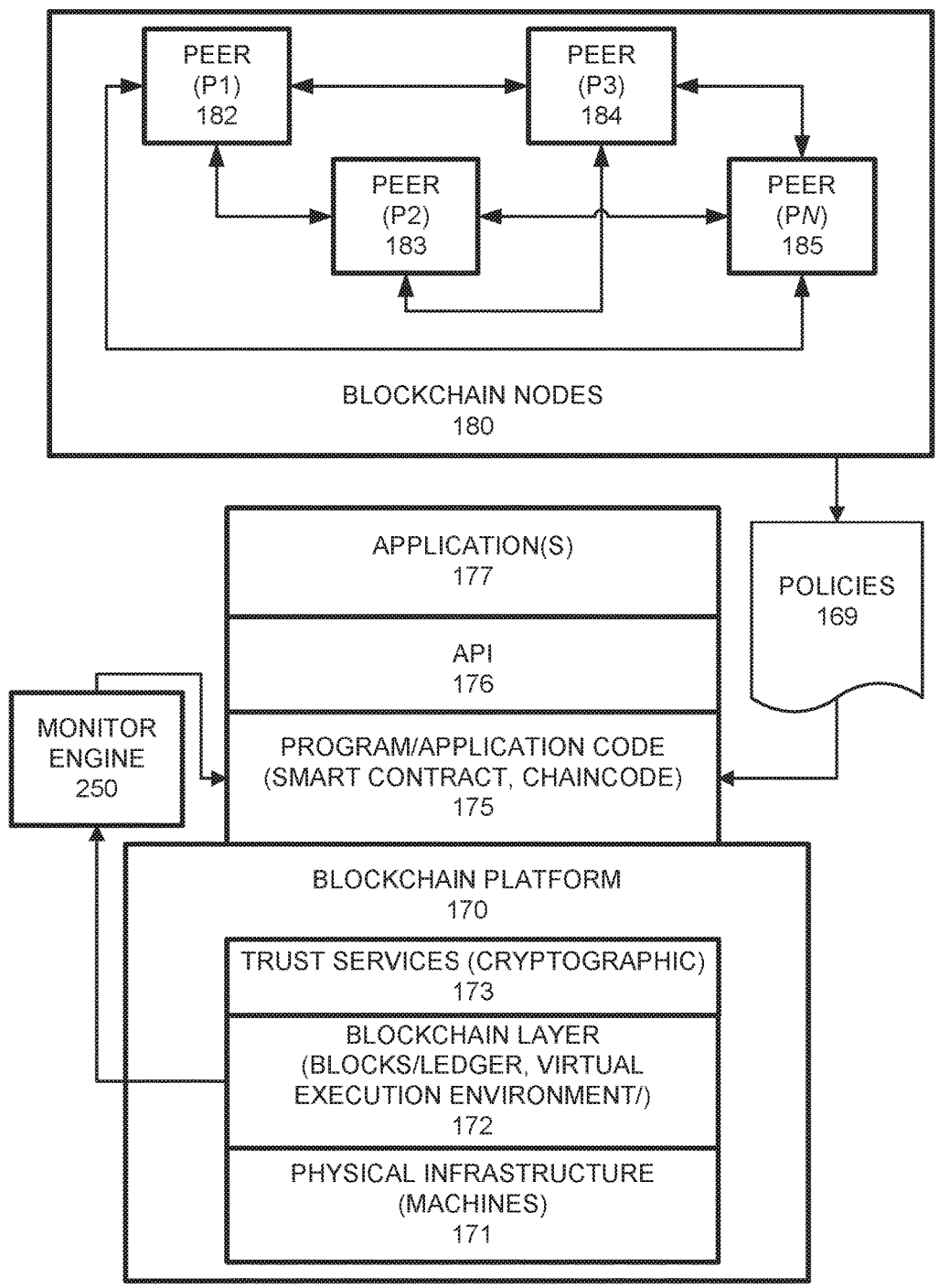
FIG. 1B illustrates a blockchain system configuration according to example embodiments.

FIG. 1B illustrates a blockchain system configuration according to example embodiments. The blockchain system 150 may include certain common blockchain elements, such as a group 180 of assigned peers 182-185 which participate in the blockchain transaction addition and validation process (consensus). Any of the blockchain peer nodes 180 may initiate new transactions and seek to write to the blockchain immutable ledger 172, a copy of which is stored on the underpinning physical infrastructure 171. In this configuration, the customized blockchain configuration may include one or applications 177 which are linked to APIs 176 to access and execute stored program/application code (e.g., chain code and/or smart contracts) 175, which are created according to the customized configuration sought by the participants and can maintain their own state, control its own assets, and receive external information. This code can be deployed as a transaction and installed, via appending to the distributed ledger, on all blockchain peer nodes.

The blockchain base 170 includes the various layers of blockchain data, services (e.g., cryptographic trust services, virtual execution environment), and underpinning physical computer infrastructure necessary to receive and store new transactions and provide access to auditors which are seeking to access data entries. The blockchain layer 172 exposes an interface that provides access to the virtual execution environment necessary to process the program code and engage the physical platform 171. Cryptographic trust services 173 are used to verify transactions and keep information private. As a result, smart contract changes which are proposed and/or approved (i.e., via consensus among peers) can be created and updated on the blockchain to accurately update consumer debt information.

The blockchain configuration of FIG. 1B may process and execute program/application code 175 by way of the interfaces exposed, and the services provided, by blockchain platform 170. The code may control blockchain assets, for example, it can store and transfer data, and may be executed by the blockchain in the form of a smart contract, which includes chain code with conditions or other code elements subject to its execution. The smart contracts 175 may be created to execute reminders, updates, and/or other notifications subject to the changes, updates, etc. The smart contracts can themselves be used to identify network usage and data 10 statuses and compare the actual network resource levels to contractual thresholds and other variables which may be exceeded or enacted to launch changes or notifications. For example, the thresholds of data IO, if exceeding smart contract levels, may be identified and used as the basis for a tier change, notification and/or suggested course of action, both manual and/or automated. The tiering may occur automatically if the smart contract permits the change upon detection of the exceeded threshold. The policies 169, once decided by the peers via consensus, can be updated into the smart contracts 175 accordingly. The monitoring engine 250 tracks data volume TO (i.e., file TO, object reads/writes, etc.).

Figure 2:
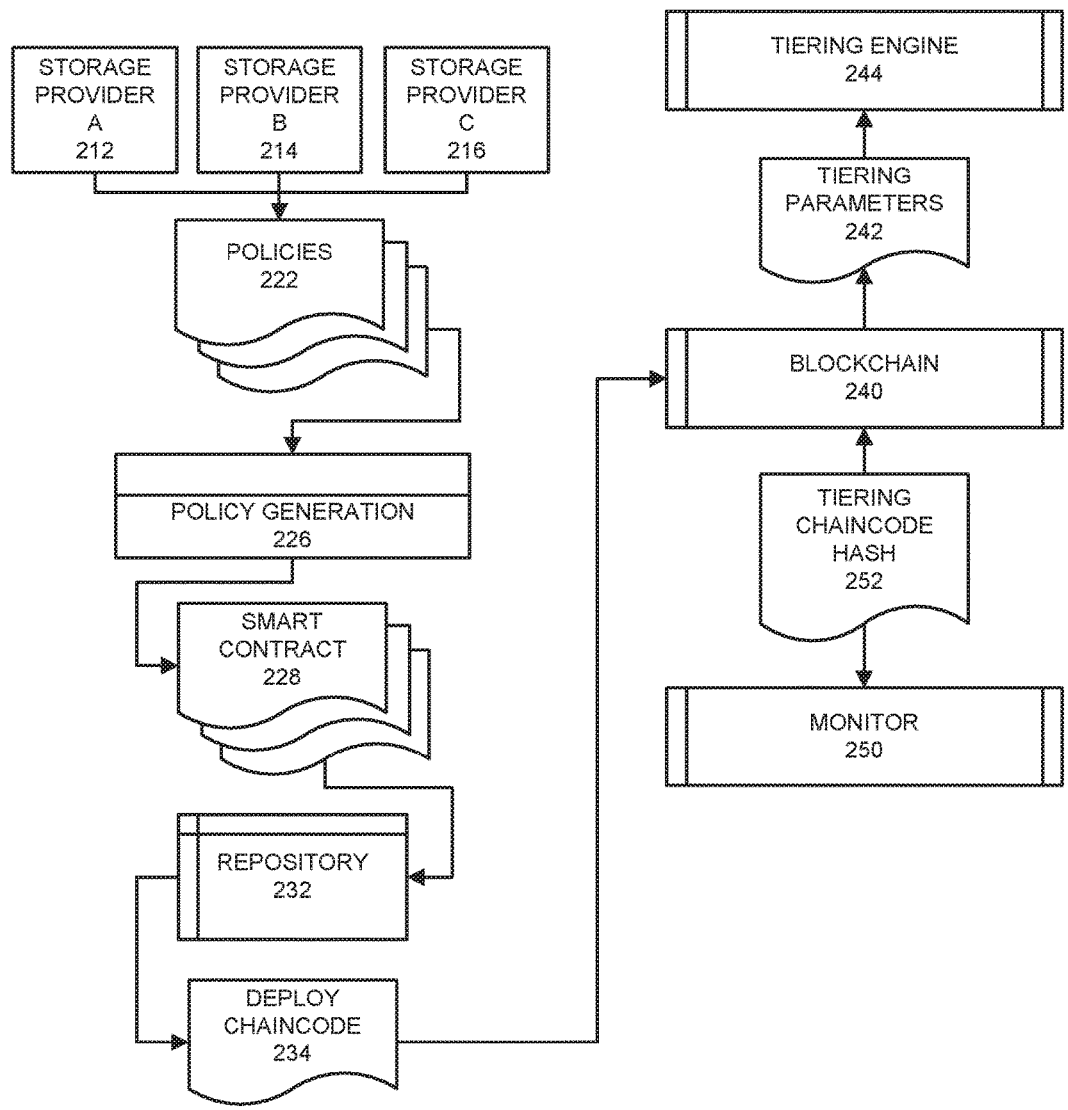
FIG. 2 illustrates a logic diagram of information flow and processes via the blockchain, according to example embodiments.

FIG. 2 illustrates a logic diagram 200 of information flow and processes via the blockchain, according to example embodiments. Referring to FIG. 2, the process may include generating and executing smart contracts for the tiering/ILM context to be enacted on the network system. Each of the providers/parties 212-216 may define their tiering policies 222. The policy generation engine 226 consolidates those policies and represents them as a smart contract 228. The smart contract may be enacted to undergo a review process and may be deployed on the blockchain 240. The monitoring engine 250 tracks data volume IO (i.e., file IO, object reads/writes, etc.), and periodically invokes the policy chaincode 234 of the repository 232 based on a tunable window of time. Furthermore, the monitor 250 is responsible for validating the state of the system, and checking if it does indeed reflect the state in the blockchain.

When volumes are down/up-tiered, the world state of the system changes within the blockchain 240 itself, and thus outside parties cannot modify the state of the system without the monitor 250 having observed such changes. The monitoring engine invokes the policy chaincode via its tiering hash 252. The chaincode 234 validates signatures and executes in the different peer-nodes as operating entities or virtual machines constructed to perform the dedicated smart contract procedures and for performing consensus on whether to tier, not tier, backup or not, migrate or not, etc. Then, the chaincode invokes the tiering engine 244 to execute the up/down-tier operation for the particular volume or file/object based on tiering parameters 242.

In this configuration, the monitor 250 and the tiering engine 244 operate outside of the blockchain, however, running monitoring chaincode that validate the state of the system can also be performed. Similarly, the tiering engine logic could also run within the blockchain 240. This approach would provide a high-availability service, so even if one node fails, the rest of the network can still operate, and the established tiering/ILM functionality will not be lost. Although, the examples focus on storage tiering/ILM, this process can be extended to many other storage management or network resource techniques. Each component writes provenance data onto the blockchain 240 describing the new or different actions performed. For example, executing a tier policy, how much data/number of objects/number of files and/or tier source/destinations, or which chaincode was deployed by which parties. This will permit full transparency and provide auditing logic.

Each provider has a set of policies that need to be enforced. Each policy is translated into chaincode (initial mapping) or an abstract representation. Next, a smart contract is generated from those identified requirements, which could be formally verified by formal procedures. Next, the smart contract is forwarded to a 'control repository' where developers and parties belonging to the different storage providers can work collectively on the smart contract. Once ready, the contract is signed-off (proof that they agreed on it), and it is deployed on the blockchain. The monitoring service runs either within the blockchain as a system chaincode or via a stand-alone server that has access to the blockchain. This service invokes the chaincode to trigger migrations when needed. Or, on a periodic basis, invokes tiering chaincodes to check the state of the smart contract. Alternatively, the state of the infrastructure may be checked to determine whether a change is detected, and trigger all tiering chaincodes to see if there is a need to migrate data volumes. The tiering engine can be created based on system chaincode similar to the monitor, or exist as a stand-alone service that manages migrations. When a migration occurs, the state of the infrastructure is updated.

Figure 3:
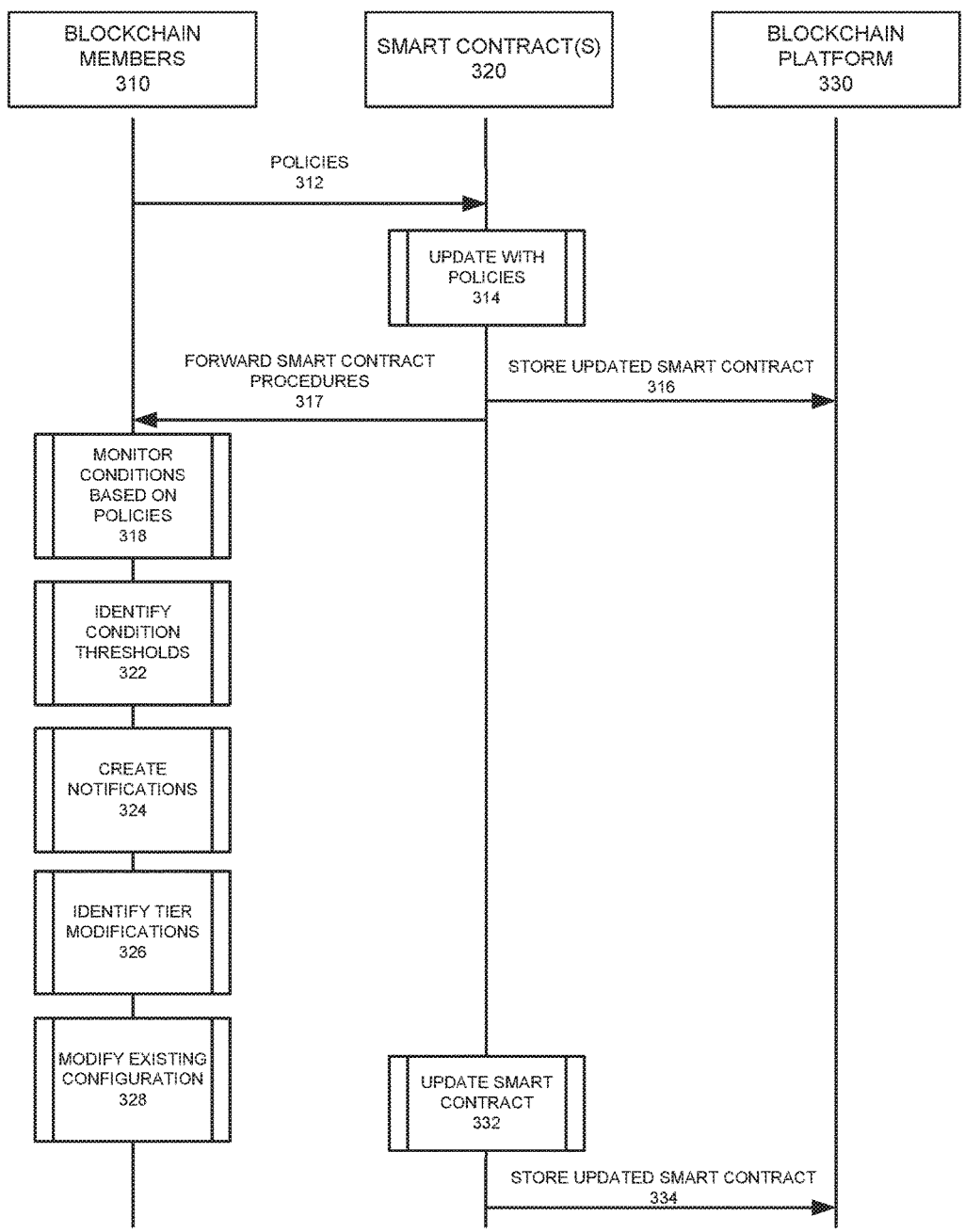
FIG. 3 illustrates a system messaging diagram of the interactions between blockchain members and a smart contract(s) of the blockchain, according to example embodiments.

FIG. 3 illustrates a system messaging diagram of the interactions between a number of components or modules which may include software, hardware or a combination of both. The components may include a first component, such as blockchain members 310 and a second component, such as a smart contract(s) 320 and a third component, such as a blockchain platform, according to example embodiments.

Referring to FIG. 3, the system 300 include blockchain members or peer nodes 310, which operate to offer consensus on policies and to perform smart contract execution platforms to enable smart contract compliance 320. The blockchain platform 330 represents the blockchain infrastructure used to store transactions and other blockchain data. In operation, the policies 312 represent the agreed upon terms of the smart contract with regard to the operating conditions of the network system. For example, the data IO densities required for a particular tier prior to moving a data volume to a higher or lower tier. Once the data IO density exceeds a tier level, as defined by terms and requirements of the smart contract, the data tier may be changed. The updates to the policies 314 are stored in the smart contract(s) 320, which in turn, are logged 316 in the blockchain 300. Smart contract data is forwarded 317 and updated with the blockchain members. The ongoing activity of the network may be monitored according to the terms of the smart contract 318. The blockchain members or other designated machines or virtual machines in the cloud may be setup to perform the monitoring. If one or more condition thresholds 322 are exceeded or underperformed, the changes needed to be made are identified and notifications 324 may be created to inform the necessary parties. Tier modifications may be made and stored in the smart contracts 326 and the network configurations may also be changed 328 and stored in the blockchain 330. The smart contract 332 may be updated and stored in the blockchain 334.

Figure 4A:
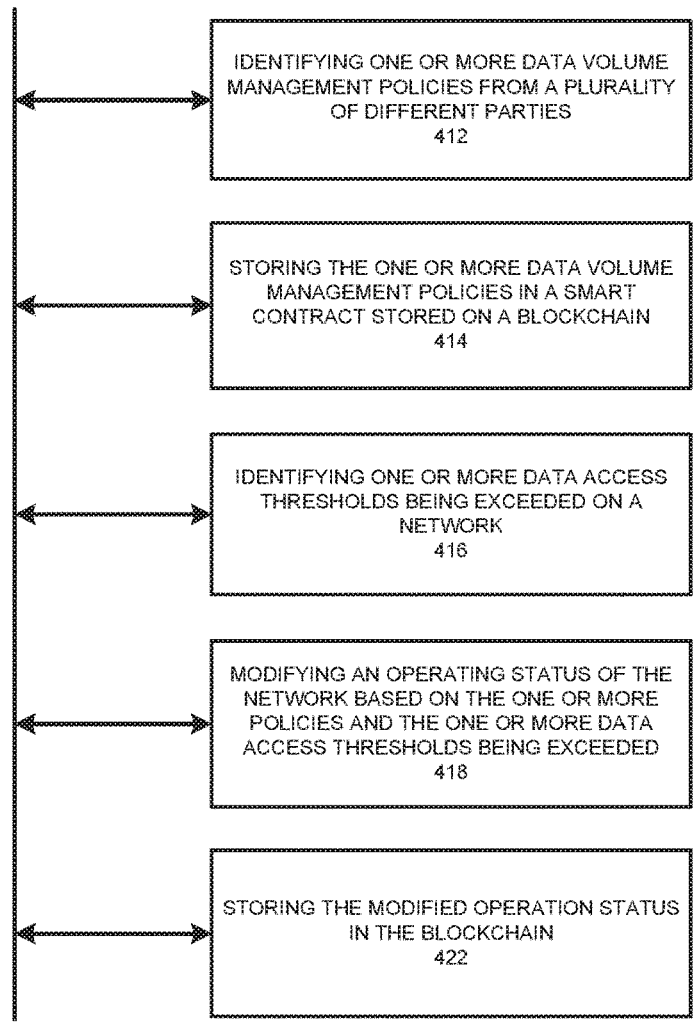
FIG. 4A illustrates a flow diagram of an example method of managing smart contract modifications in the blockchain, according to example embodiments.

FIG. 4A illustrates a flow diagram of an example method of managing smart contract modifications in the blockchain, according to example embodiments. Referring to FIG. 4A, the method 400 may include identifying one or more data volume management policies from a plurality of different parties 412, storing the one or more data volume management policies in a smart contract stored on a blockchain 414, identifying one or more data access thresholds being exceeded on a network 416, modifying an operating status of the network based on the one or more policies and the one or more data access thresholds being exceeded 418, and storing the modified operating status in the blockchain 422.

The one or more policies in the smart contract may be signed by a consensus of blockchain members. The method may also include defining the one or more policies in the smart contract based on an input/output (IO) density exceeding the one or more data access thresholds, modifying the operating status of the network comprises modifying a tier level assigned to one or more data volumes, reassigning one or more data volumes to a new data access tier. The new data access tier includes an input/output (IO) density that is higher or lower than a previously assigned data access tier. The method may also include validating signatures and executing the smart contract via one or more blockchain member nodes, and changing a data access tier assigned to one or more data volumes of the network.

Figure 4B:
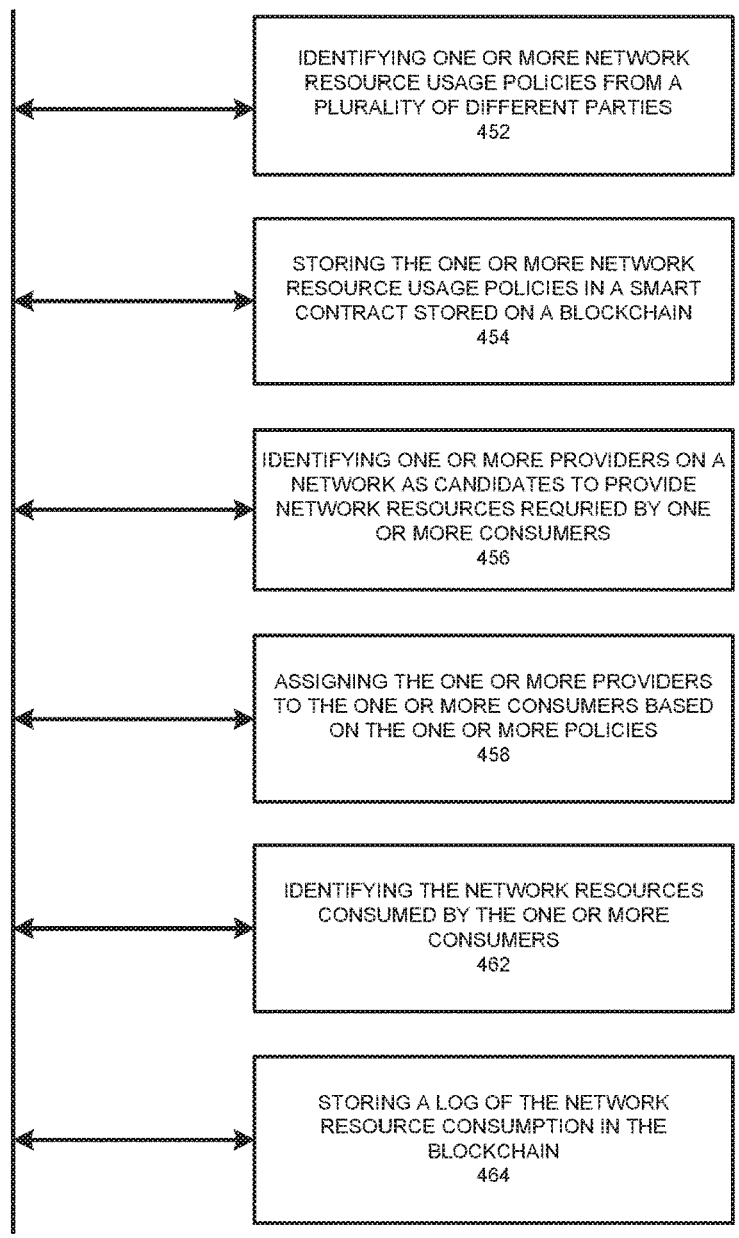
FIG. 4B illustrates a flow diagram of an example method of managing smart contract modifications in the blockchain, according to example embodiments.

FIG. 4B illustrates a flow diagram of an example method of managing smart contract modifications in the blockchain, according to example embodiments. This method 450 may provide identifying one or more network resource usage policies from a plurality of different parties 452, storing the one or more network resource usage policies in a smart contract stored on a blockchain 454, identifying one or more providers on a network as candidates to provide network resources required by one or more consumers 456, assigning the one or more providers to the one or more consumers based on the one or more policies 458, and identifying the network resources consumed by the one or more consumers 462, and storing a log of the network resource consumption in the blockchain 464.

In this example embodiment, the smart contract may store requirements of one or more users/consumers to the network. The requirements may be any type of network resources, such as memory, CPU utilization, throughput, bandwidth, priority, etc. The requirements may be itemized in a network resource usage policy table or file. The policies related to the requirements may define the requirements and the provider requirements necessary to fulfill the consumer needs. The smart contract may store such information and may be referenced by providers seeking to conduct transactions with those consumers, especially when the provider has the resources to provide. The results of a consumption session may be stored in the blockchain as an updated log to the smart contract execution.

Example embodiments may be a system, a method, and/or a computer program product at any possible technical detail level of integration. The computer program product may include a non-transitory computer readable storage medium (or media) having computer readable program instructions thereon for causing a processor to carry out aspects of the embodiments.

The non-transitory computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

Aspects of the embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 5 illustrates an example network element 500, which may represent or be integrated in any of the above-described components, etc.

Figure 5:
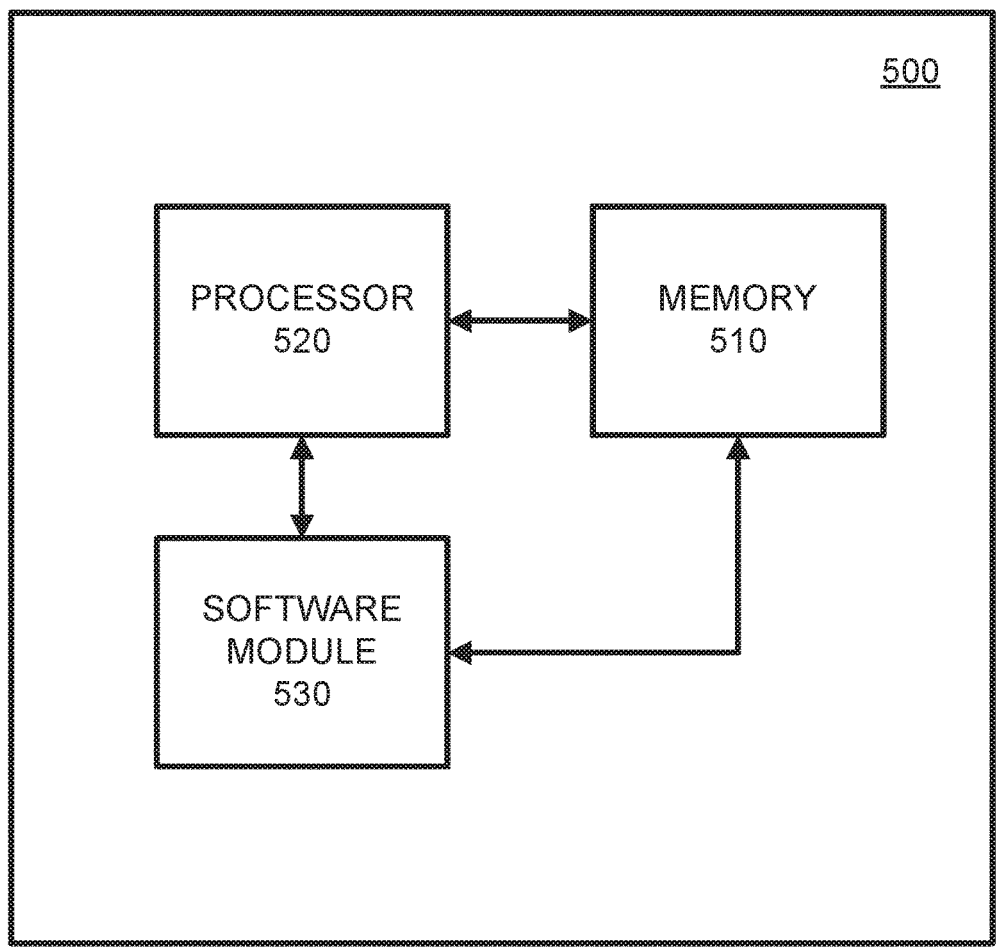
FIG. 5 illustrates an example network entity configured to support one or more of the example embodiments.

As illustrated in FIG. 5, a memory 510 and a processor 520 may be discrete components of a network entity 500 that are used to execute an application or set of operations as described herein. The application may be coded in software in a computer language understood by the processor 520, and stored in a computer readable medium, such as, a memory 510. The computer readable medium may be a non-transitory computer readable medium that includes tangible hardware components, such as memory, that can store software. Furthermore, a software module 530 may be another discrete entity that is part of the network entity 500, and which contains software instructions that may be executed by the processor 520 to effectuate one or more of the functions described herein. In addition to the above noted components of the network entity 500, the network entity 500 may also have a transmitter and receiver pair configured to receive and transmit communication signals (not shown).

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method implemented by a processor executing computer program instructions stored in memory, comprising:
   identifying, by the processor, one or more data volume management policies from a plurality of different parties;
   storing in the memory, by the processor, the one or more data volume management policies in a smart contract stored on a blockchain;
   identifying, by the processor, one or more data access thresholds being exceeded on a network;
   modifying an operating status of the network, by the processor, based on the one or more data volume management policies and the one or more data access thresholds being exceeded; and
   storing the modified operating status in the blockchain in memory, by the processor.

2. The method of claim 1, wherein the one or more data volume management policies in the smart contract are signed by a consensus of blockchain members.

3. The method of claim 1, further comprising:
   defining the one or more data volume management policies in the smart contract, by the processor, based on an input/output (IO) density exceeding the one or more data access thresholds.

4. The method of claim 1, wherein the modifying of the operating status of the network comprises modifying a tier level assigned to one or more data volumes.

5. The method of claim 1, further comprising:
   reassigning one or more data volumes, by the processor, to a new data access tier.

6. The method of claim 5, wherein the new data access tier comprises an input/output (IO) density that is higher or lower than a previously assigned data access tier.

7. The method of claim 1, further comprising:
   validating signatures and executing the smart contract via one or more blockchain member nodes, by the processor; and
   changing a data access tier assigned to one or more data volumes of the network, by the processor.

8. An apparatus, comprising:
   a processor configured to:
   identify one or more data volume management policies from a plurality of different parties;
   store the one or more data volume management policies in a smart contract stored on a blockchain;
   identify one or more data access thresholds being exceeded on a network;
   modify an operating status of the network based on the one or more data volume management policies and the one or more data access thresholds being exceeded; and
   store the modified operating status in the blockchain.

9. The apparatus of claim 8, wherein the one or more data volume management policies in the smart contract are signed by a consensus of blockchain members.

10. The apparatus of claim 8, wherein the processor is further configured to define the one or more data volume management policies in the smart contract based on an input/output (IO) density exceeding the one or more data access thresholds.

11. The apparatus of claim 8, wherein the modifying of the operating status of the network comprises modifying a tier level assigned to one or more data volumes.

12. The apparatus of claim 8, wherein the processor is further configured to:
    reassign one or more data volumes to a new data access tier.

13. The apparatus of claim 12, wherein the new data access tier comprises an input/output (IO) density that is higher or lower than a previously assigned data access tier.

14. The apparatus of claim 8, wherein the processor is further configured to:
    validate signatures and execute the smart contract via one or more blockchain member nodes; and
    change a data access tier assigned to one or more data volumes of the network.

15. A non-transitory computer readable storage medium configured to store instructions that, when executed, cause a processor to perform:
    identifying one or more data volume management policies from a plurality of different parties;
    storing the one or more data volume management policies in a smart contract stored on a blockchain;
    identifying one or more data access thresholds being exceeded on a network;
    modifying an operating status of the network based on the one or more data volume management policies and the one or more data access thresholds being exceeded; and
    storing the modified operating status in the blockchain.

16. The non-transitory computer readable storage medium of claim 15, wherein the one or more data volume management policies in the smart contract are signed by a consensus of blockchain members.

17. The non-transitory computer readable storage medium of claim 15, wherein the instructions are further configured to cause the processor to perform:
    defining the one or more data volume management policies in the smart contract based on an input/output (IO) density exceeding the one or more data access thresholds.

18. The non-transitory computer readable storage medium of claim 15, wherein the modifying of the operating status of the network comprises modifying a tier level assigned to one or more data volumes.

19. The non-transitory computer readable storage medium of claim 15, wherein the instructions are further configured to cause the processor to perform:
    reassigning one or more data volumes to a new data access tier.

20. The non-transitory computer readable storage medium of claim 15, wherein the instructions are further configured to cause the processor to perform:
    validating signatures and executing the smart contract via one or more blockchain member nodes; and
    changing a data access tier assigned to one or more data volumes of the network, wherein
    the new data access tier comprises an input/output (IO) density that is higher or lower than a previously assigned data access tier.

* * * * *